United States Patent
Frank et al.

(10) Patent No.: US 10,723,464 B2
(45) Date of Patent: Jul. 28, 2020

(54) INJECTOR NOZZLE CONFIGURATION FOR SWIRL ANTI-ICING SYSTEM

(71) Applicant: ROHR, INC, Chula Vista, CA (US)

(72) Inventors: Joel H. Frank, La Jolla, CA (US); Lubomir A. Ribarov, West Hartford, CT (US)

(73) Assignee: ROHR, INC., Chula Vista, CA (US)

( * ) Notice: Subject to any disclaimer, the term of this patent is extended or adjusted under 35 U.S.C. 154(b) by 464 days.

(21) Appl. No.: 14/836,015

(22) Filed: Aug. 26, 2015

(65) Prior Publication Data

US 2017/0057643 A1    Mar. 2, 2017

(51) Int. Cl.
| | | |
|---|---|---|
| B64D 15/04 | (2006.01) | |
| F02C 7/047 | (2006.01) | |
| B64D 27/16 | (2006.01) | |
| B64D 33/02 | (2006.01) | |

(52) U.S. Cl.
CPC ............ B64D 15/04 (2013.01); B64D 27/16 (2013.01); F02C 7/047 (2013.01); B64D 2033/0233 (2013.01); Y02T 50/671 (2013.01)

(58) Field of Classification Search
CPC . B64D 15/04; B64D 27/16; B64D 2033/0233
See application file for complete search history.

(56) References Cited

U.S. PATENT DOCUMENTS

| | | | |
|---|---|---|---|
| 1,819,497 A | 8/1931 | Chisholm | |
| 2,135,119 A | 11/1938 | Wood | |
| 2,680,345 A | 6/1954 | Frost | |
| 3,057,154 A | 10/1962 | Sherlaw et al. | |
| 3,549,964 A | 12/1970 | Levin et al. | |
| 3,925,979 A | 12/1975 | Ziegler | |
| 3,933,327 A | 1/1976 | Cook et al. | |
| 4,060,212 A | 11/1977 | Magenheim | |
| 4,250,250 A | 2/1981 | Miyakawa et al. | |
| 4,406,431 A | 9/1983 | Heuberger | |
| 4,688,745 A * | 8/1987 | Rosenthal ............ | B64D 15/04 244/134 R |

(Continued)

FOREIGN PATENT DOCUMENTS

| | | |
|---|---|---|
| FR | 2823533 A1 | 10/2002 |
| FR | 2953254 A1 | 6/2011 |

(Continued)

*Primary Examiner* — Brian M O'Hara
*Assistant Examiner* — Keith L Dixon
(74) *Attorney, Agent, or Firm* — Cantor Colburn LLP

(57) ABSTRACT

An anti-icing system for annular turbofan engine housings what include a substantially closed annular housing at a leading edge of the turbofan engine housing, the annular housing containing a quantity of air and a conduit extending from a source of high pressure hot gas to the annular housing. The system also includes an injector connected to the end of the conduit and extending into the annular housing; one or more nozzles extending outwardly from the injector in a direction that the quantity of air circulates in the annular housing while the turbofan engine is operating. The nozzles have an entrance in fluid contact with the injector and an exit, wherein a cross-sectional area of the entrance is less than a cross-sectional area of the exit such that gas leaving the nozzles is travelling slower than gas entering the nozzles.

18 Claims, 5 Drawing Sheets

(56) References Cited

U.S. PATENT DOCUMENTS

| | | | |
|---|---|---|---|
| 5,011,098 A * | 4/1991 | McLaren | B64D 15/04 244/134 B |
| 5,088,277 A | 2/1992 | Schulze | |
| RE36,215 E | 6/1999 | Rosenthal | |
| 6,267,328 B1 | 7/2001 | Vest | |
| 6,354,538 B1 * | 3/2002 | Chilukuri | B64D 15/04 244/134 B |
| 6,443,395 B1 * | 9/2002 | Porte | B64D 15/04 244/134 R |
| 6,698,691 B2 * | 3/2004 | Porte | B64D 15/04 244/134 B |
| 6,702,233 B1 * | 3/2004 | DuPont | B64D 15/04 244/134 B |
| 7,837,150 B2 | 11/2010 | Zecca et al. | |
| 7,838,150 B2 | 11/2010 | Kinoshita et al. | |
| 7,900,872 B2 | 3/2011 | Sternberger | |
| 8,047,470 B2 | 11/2011 | Porte | |
| 8,061,657 B2 | 11/2011 | Rocklin et al. | |
| 8,757,547 B2 * | 6/2014 | Porte | B64D 33/02 244/134 B |
| 8,777,164 B2 | 7/2014 | Vauchel et al. | |
| 8,931,284 B2 | 1/2015 | Hussain et al. | |
| 2002/0148929 A1 * | 10/2002 | Andre | B64D 15/04 244/134 R |
| 2002/0179773 A1 * | 12/2002 | Breer | B64D 15/04 244/134 R |
| 2009/0152401 A1 * | 6/2009 | Sternberger | B64D 33/02 244/134 B |

FOREIGN PATENT DOCUMENTS

| | | |
|---|---|---|
| GB | 2083420 A | 3/1982 |
| WO | 2015059489 A1 | 4/2015 |

* cited by examiner

INJECTOR NOZZLE CONFIGURATION FOR SWIRL ANTI-ICING SYSTEM

BACKGROUND OF THE INVENTION

Embodiments of the present disclosure relate to anti-icing systems for aircraft jet engine (i.e. gas turbine) propulsion systems and more particularly, to nozzle configurations on an injector in a swirling rotational anti-icing system for an inlet of a gas turbine engine.

Safety is a primary concern in the design of power propulsion systems for aircraft applications. The formation of ice on aircraft wings, tail fins, flight control surfaces, propellers, air inlets of engines, etc., has been a problem since the earliest days of heavier-than-air flight. Any accumulated ice adds considerable weight, and changes the airfoil or inlet configuration thereby making the aircraft much more difficult to fly and, in some cases, has caused loss of aircraft. In the case of gas turbine aircraft, large pieces of ice breaking loose from the leading edge of the gas turbine engine inlet housing can severely damage rotating fan-, compressor-, and turbine blades which extend across the flow path and interact with the working fluid or other internal fixed engine components (i.e. stator vanes) and cause engine failure.

Many attempts have been made to overcome the problems and dangers of aircraft icing. Anti-ice systems for the inlet area of nacelles for aircraft propulsion systems have been the focus of a significant amount of research and development within the aircraft industry. For example, proposals have been made, as described in U.S. Pat. No. 2,135,119 to mechanically vibrate external surfaces to break ice loose or as described in U.S. Pat. No. 3,549,964 to generate electromagnetic pulses in the aircraft skin to break ice loose. These systems, however tend to be heavy and complex and remove only existing ice, rather than prevent ice formation.

Heating areas of the aircraft prone to icing has been suggested many times. The heating schemes suggested range from microwave heating as suggested by U.S. Pat. No. 4,060,212 to feeding hot gases through holes in the skin, as suggested by U.S. Pat. No. 4,406,431, to resistance heating of the surfaces, as in U.S. Pat. No. 1,819,497, to actually burning fuel adjacent to ice-prone surfaces, as described in U.S. Pat. No. 2,680,345. While each of these methods may have some advantages none had been truly effective.

One of the most common anti-icing techniques has been the ducting of hot gases into a housing adjacent to the likely icing area. Typical of the patents describing such hot gas techniques are U.S. Pat. Nos. 3,057,154; 3,925,979; 3,933,327 and 4,250,250. In each case, the hot gas conduits simply dump hot gases into the housing, such as the leading edge of a gas turbine engine housing or a wing leading edge. While often useful, these systems are not fully effective due to the complexity of the hot gas duct system.

A typical design for a civil aircraft gas turbine engine nose cowl ice protection system was the double skin, spray bar configuration which employed an annular duct or skin installed within the nose cowl "D-duct" or D-shaped duct space. Hot bleed air jets issuing from small orifices, or piccolo holes, on the spray tube were directed on entrance into the D-duct into double skin passages along the upper and lower lip surfaces of the nose lip of the inlet. Hot bleed air was then forced to flow through narrow gaps between the outside skin and the inner skin, transferring heat to the outer skin. While some heat effectiveness was achieved by the double skin design it was at the expense of high manufacturing cost and weight penalty, associated with the required chem-milling process to produce the inner skin and to provide the spray tube arrangement.

Another advance in anti-icing systems was made in U.S. Pat. No. 4,688,745 entitled "Swirl Anti-Ice System" and issued to Rosenthal. This patent provided for the circulation of heated gases within the circular leading edge of a gas turbine engine housing in a rotational swirling motion to prevent ice build-up thereon. Hot gas, such as bleed air from a hot, high-pressure section of the gas turbine engine compressors was directed to the D-duct inlet interior through a conduit that enters the annular leading edge housing through a bulkhead closure. The conduit is then turned about 90° to a direction tangential to the leading edge annulus. The hot bleed air exiting an injection nozzle, provided as an outlet of such conduit entrain the cooler D-duct rotating air in the circular leading edge and cause the much larger mass of cooler D-duct rotating air within the inside of the inlet lip to swirl circularly around the interior of the D-duct of the annular housing. The entering hot bleed air heats the mass of cooler D-duct air to an intermediate but still relatively high temperature which then uniformly transfers heat to the skin of the leading edge without leaving any relatively cold areas and thereby preventing the formation of ice on the inlet lip. A fraction of the flow of entrained heated air that is equal to the flow rate of injected hot bleed air is exhausted from such D-duct housing.

While this anti-icing system represented a significant advancement over the prior art and has been widely accepted in the aircraft industry, there are areas of the system which may be improved. It has been found that as the near-sonic or sonic jet nozzle injects the hot bleed air into the cooler D-duct rotating air within the annular nose cowl or nose lip of the inlet, the complete mixing of the two masses of air is somewhat delayed during the rotational swirling action and results in a "hot spot" or area of elevated temperature on the outer lip skin of the nose lip at a position downstream of such injection. This area of elevated temperature in the nose lip then presents a constraint in the design of an anti-icing system according to teachings of such patent since such design must take into account actual conditions such as a day having an elevated ambient temperature, a low altitude take-off location for the aircraft, a high engine power setting, and a failure to an open position of an anti-ice valve, provided in the conduit for supplying hot bleed air from the engine's compressors as required.

Thus, there is a continuing need to improve aircraft engine nacelle icing prevention and to improve particularly the anti-icing system of U.S. Pat. No. 4,688,745 by enhancing the mixing of the injected hot gas and the mass of swirling air contained within the D-duct nose lip of an aircraft jet engine housing to improve the performance of the anti-icing system and to lessen design constraints imposed by the area of elevated temperature in the nose lip downstream of the point of injection of the hot bleed air.

BRIEF DESCRIPTION OF THE INVENTION

Disclosed herein is an anti-icing system for annular turbofan engine housings which comprises a substantially closed annular housing at a leading edge of the turbofan engine housing, the annular housing containing a quantity of air, a conduit extending from a source of high pressure hot gas to the annular housing and an injector connected to the end of the conduit and extending into the annular housing. The system also includes one or more nozzles extending outwardly from the injector in a direction that the quantity of air circulates in the annular housing while the turbofan engine is operating, the nozzles having an entrance in fluid contact with the injector and an exit, wherein a cross-sectional area of the entrance is less than a cross-sectional area of the exit such that gas leaving the nozzles is travelling slower than gas entering the nozzles.

Also disclosed is an anti-icing system for annular turbofan engine housings which comprises a substantially closed annular housing at a leading edge of the turbofan engine housing, the annular housing containing a quantity of air, a conduit extending from a source of high pressure hot gas to the annular housing, and an injector connected to the end of the conduit and extending into the annular housing. The system also includes one or more nozzles extending outwardly from the injector in a direction that the quantity of air circulates in the annular housing while the turbofan engine is operating, the nozzles having an entrance in fluid contact with the injector and an exit, wherein one of the one or more nozzles has a length, L, and wherein the one of the one or more nozzles curves along its length as it extends away from the injector.

Further disclosed is an anti-icing system for annular turbofan engine housings which comprises a substantially closed annular housing at a leading edge of the turbofan engine housing, the annular housing containing a quantity of air, a conduit extending from a source of high pressure hot gas to the annular housing, and an injector connected to the end of the conduit and extending into the annular housing. The system also includes one or more nozzles extending outwardly from the injector in a direction that the quantity of air circulates in the annular housing while the turbofan engine is operating, the nozzles having an entrance in fluid contact with the injector and an exit, wherein an outer perimeter of at least one of the one or more nozzles is irregular shaped and surrounds at least a portion of a central diffuser element disposed in a flow path of the gas entering the nozzles.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
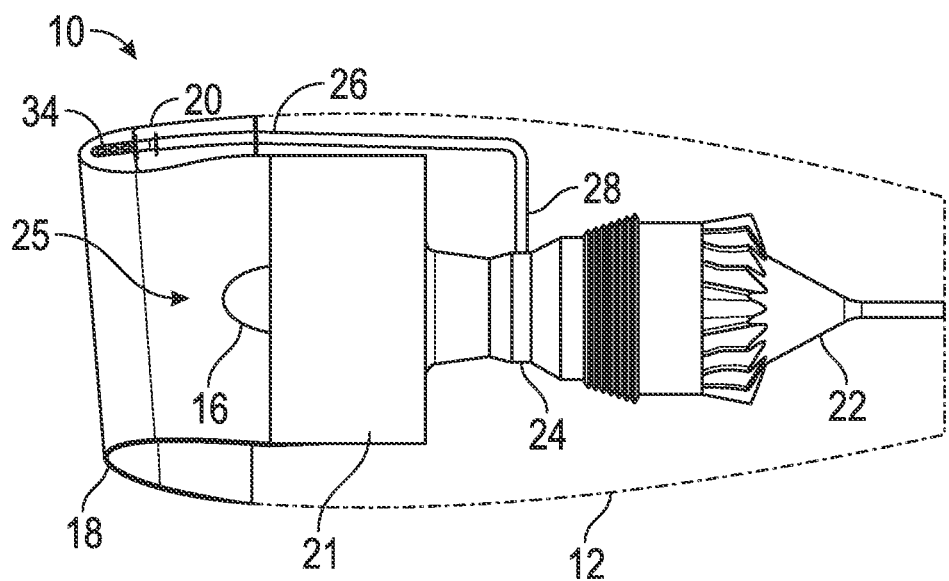
FIG. 1 shows a schematic representation of an exemplary turbofan gas turbine engine.

Referring now to the drawings in detail and in particular to FIG. 1, there is seen a schematic representation of an exemplary gas turbine engine 10 of the type suitable for aircraft propulsion. The gas turbine engine 10 is housed within a nacelle cowl housing 12. Air enters the gas turbine engine 10 through an air inlet section 25, between the nose cap 16 (or "spinner") of the engine and the nose lip 18 or annular single skin housing which constitutes the forward most section of the gas turbine engine inlet housing 20 of the engine nacelle, some of which components have been omitted from FIG. 1 for purposes of ease of understanding. Engine thrust is produced by: (i) burning incoming core air flow and fuel within the engine 10 positioned with the central housing 24 and (ii) by compressing and passing the large mass bypass air flow of inlet air through the fan portion 21 of the gas turbine engine. Hot, high-pressure propulsion gases of the engine 10 pass through exhaust outlet 22 and out the rear of the engine 10. The compressed bypass fan air flows past the outside of the engine core within the engine nacelle cowl housing 12 and exits at the rear of the engine 10. In some instances (i.e., modern high-bypass ratio turbofan engines), a majority of the total engine thrust results from the bypass air flow. Typically this can reach 80-85% of the total thrust.

In flight, under "icing conditions", ice tends to form on the nose lip 18 (in addition to other aircraft components not being considered here). The ice changes the geometry of the inlet area between the nose lip 18 and the spinner 16, adversely affecting the required quantity, disrupting the air quality, introducing engine fan tip distortion and adversely modifying the boundary layer of incoming air into the engine 10. Also, pieces of ice may periodically break free from these components and enter the engine 10, damaging fan blades or internal engine components such as stator vanes, rotor blades, etc. and potentially degrading engine performance. Embodiments disclosed herein may reduce or prevent the accumulation of ice on the surface of the annular housing 18 and mitigate or alleviate certain design constraints associated with the utilization of a swirling rotational anti-icing system. Other de-icing/anti-icing techniques may be used with the spinner 16 and other aircraft fuselage parts, such as wings, stabilizers, struts, tail fin, or flight control surfaces, and the like.

Within the compressor section 24 of the gas turbine engine 10 there is a region containing hot, high-pressure bleed air. A suitable conduit 26 or tube is connected at a first end 28 to that hot, high-pressure region. The other end of the conduit 26 is operatively coupled to a bulkhead 32 (FIG. 2) that substantially closes the nose lip 18 to form the D-duct to enclose a quantity of air with the annular space created by such bulkhead 32 and the nose lip 18 to provide a flow of hot bleed air to the interior of such D-duct. In some prior art ice-prevention-methods, the tube simply and crudely terminates at this point, serving to deliver hot bleed air into the annular space.

At times in prior art systems such hot, high-pressure bleed air was delivered to what is termed a "piccolo tube" system 34 for distributing hot gas though apertures in a tube to the vicinity of the leading edge of a nose lip. Even with complex, heavy, ducting within the annular housing, heating of the nose lip was not uniform. As a result some hot spots and other cold spots tended to occur. The former posed structural challenges for the material of the noselip of 18 of the nacelle, while the latter promoted the unwanted accumulation of ice.

Figure 2:
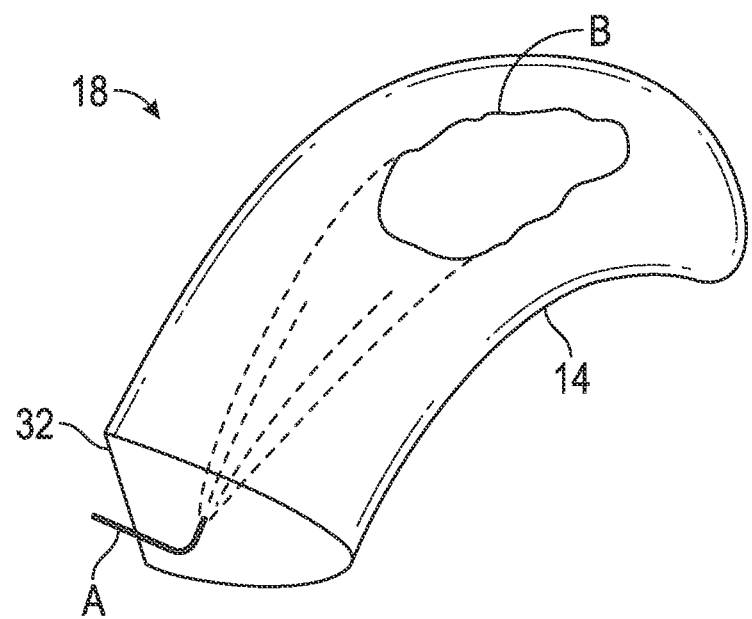
FIG. 2 shows an example of an injector used to introduce hot bleed air into the D-duct of a gas turbine engine housing.

Referring momentarily now to FIG. 2, which shows an example of an injector, in which it will be seen that a nose lip 18 is closed by a bulkhead 32 and a nozzle "A" which extends outwardly from the bulkhead 32 in a direction that is normal to the plane of the bulkhead 32 and then in a direction that is approximately parallel to said plane. The nozzle "A" then injects a flow of hot high-pressure bleed air from the engine compressor bleed port(s) into the mass of D-duct rotating air within the housing 14 and entrains it in a rotational swirling motion. The high temperature bleed air then mixes with the mass of air within the housing 14 to increase the temperature of the mixed gaseous flow to a level which is sufficient to preclude the formation of ice on the leading edge of the annular housing 14. A suitable exhaust means (i.e., the exhaust slots 38 in FIG. 3) is provided to permit a quantity of intermediate temperature air, that is equal to the amount of hot bleed air injected into the housing 14 by the nozzle "A," to escape from the housing 14.

While the nozzle "A" does entrain the ambient quantity of air contained within the housing 14 in a rotational swirling movement, such entrainment is not immediate and in certain applications, e.g., if a valve in the conduit A were to be stuck in an open position the heat of the injected hot bleed air may not be immediately transferred to the entrained mass of D-duct air and may to tend to create an area "B" in the nose lip 18 that has an elevated temperature with respect to the remaining portion of the nose lip 18. For example, an exemplary temperature for the injected hot gas may be around 1000° F. (538° C.) while the temperature of the entrained rotational swirling hot air mixture may be around 400° F. (204° C.). Thus, this area of elevated temperature or "hot spot" operates as a design constraint when designing the anti-icing system and the elements of the air inlet housing 20 (see FIG. 1). For example, the inlet 20 and the nose lip 18, among other components, must be designed to operate in an acceptable manner under such simultaneously occurring conditions for the aircraft as a hot day, low altitude of the airfield, imposition of take-off power for the aircraft, and the failure of a valve imposed in the hot bleed air conduit 26 (see FIG. 1) so as to permit that hot bleed air to flow into housing 14 under all conditions (not just a desired anti-icing flight condition).

Figure 3:
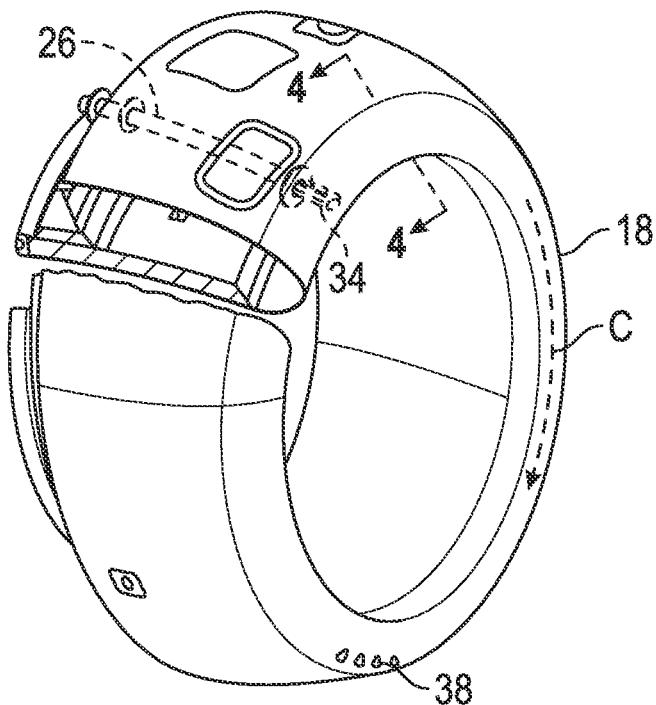
FIG. 3 shows an example of a gas turbine engine inlet housing including an injector that introduces hot bleed air into the D-duct.
Figure 4:
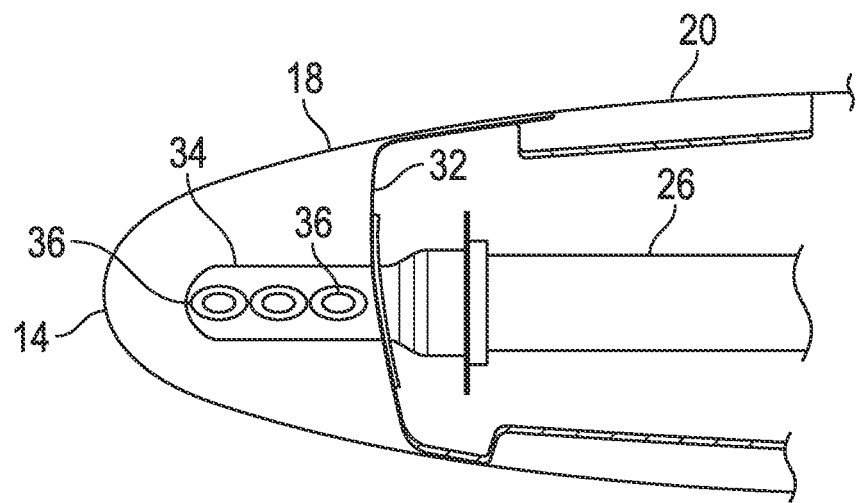
FIG. 4 is a cross-section taken along line 4-4 of FIG. 3 according to one embodiment.

Referring now to FIGS. 3 and 4, one approach that may be taken to overcome the above described drawbacks is to provide an injector 34 with nozzles 36 (see FIG. 4) described in further detail below. That is, the nozzles 36 may not be limited to those shown in FIG. 4 in some embodiments.

As above, the conduit 26 carries the hot, high pressure gas from the compressor section of a gas turbine engine 10 extends to the bulkhead 32 that closes off the annular nose lip 18 of the engine inlet housing 20 to create an annular chamber filled with air. The conduit 26 has an injector 34 connected to its outlet. The injector 34 is provided with a plurality of spaced injection nozzles 36 (or simply "nozzles") for injecting hot gas from the engine into the D-duct and thereby entraining the ambient air contained within the D-duct 14 and cause the entrained mixture of hot gas and ambient air to rotate within the D-duct in a rotating swirling flow. The mixed flow of hot air will reach a temperature that is intermediate of the temperature of the injected hot bleed air and of D-duct rotating air. The D-duct 14 is provided with a suitable exit area 38 (see FIG. 3), preferably on the outer lower portion of the D-duct to permit a volume of mixed temperature flow to exit the D-duct that is equal to the volume of hot bleed air that is injected into the D-duct through the injector 34. In the illustrated embodiment of the invention, the exit area is seen as a plurality of spaced slots 38 (in FIG. 3).

As seen especially in FIG. 4, the injector 34 extends into the D-duct 14 to present, in a first embodiment, and includes spaced injection nozzles 36 (nozzles). As described at greater length below, the nozzles 36 extend outwardly from the injector 34 in the same or generally the same direction in which the mixed flow circulates. In one embodiment, the nozzles 34 curve such they follow the circular path (shown by arrow C in FIG. 3) of the gas. For clarity, mixed flow is equal to the compressor bleed air when added to the air already present in the D-duct.

The above discussed methods of introducing a hot gas into the D-duct 14. It may be beneficial, however, when injecting hot compressor bleed gas into the D-duct 14 if it is more fully and rapidly mixed with the circulating air. One or more of the embodiments below allow for such mixing and that mixing may provide more uniform heat transfer to the D-duct surfaces and possibly reduce a "hot spot" as shown by reference "B" in FIG. 2. The "hot spots" on the surface of the D-duct 14 that may arise due to localized elevated temperature profiles may force unnecessary constraints on the design and material selection of the D-duct's 14 surfaces, potentially making its construction more expensive and heavier. In addition, prior art nozzles were typically elliptically/cylindrically-shaped hot bleed air injection nozzles that protrude into the D-duct flow and cause significant total pressure losses due to both obstruction of the flow as well as inadequate mixing of the two coalescing flows. This is due to the fact that the velocity of the air flow in the D-duct 14 is typically in the Mach 0.4 to Mach 0.5 range, while the hot bleed air is entering at a velocity of approximately sonic conditions. This may result in significant velocity shear (due to the local velocity mismatch) and cause high levels of turbulence, eddy vortices, and significant total pressure losses. These undesirable loss mechanisms, in turn, may cause decreased flow mixing, reduced anti-icing performance due to the reduced amount of swirl energy and may require unnecessary higher supply mass flows, supply pressures and temperatures to drive the system to meet the same objectives as the present invention.

One embodiment of the present invention is directed to shaping and size of the nozzles 36 that extend outwardly from the injector 34. The shaping and sizing of the nozzles 36 may allow for the hot bleed air exiting them and the circulating gas in the D-duct to travel at speeds that more closely matched one another than in embodiments discussed above. This, in turn, may allow the hot gas exiting the nozzles and the circulating gas in the D-duct to mix better.

Figure 5A:
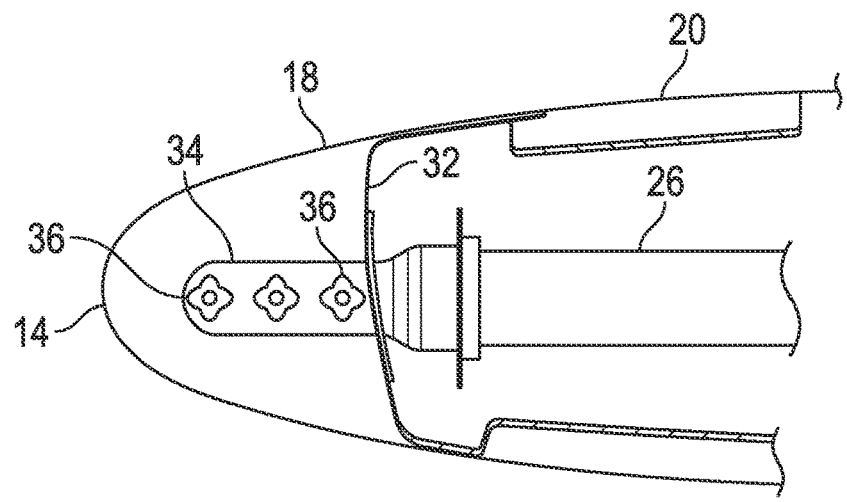
FIGS. 5A-5F show a cross-section taken along line 4-4 of FIG. 3 according to one embodiment and alternative shapes for nozzles.
Figure 5B:
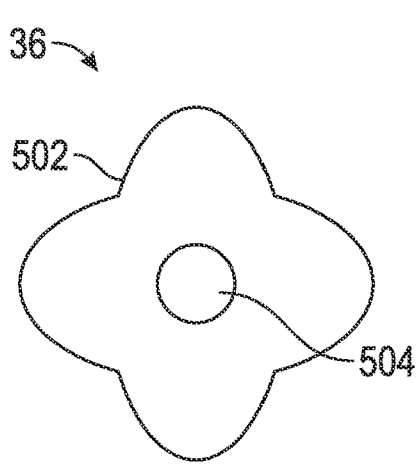
Figure 5C:
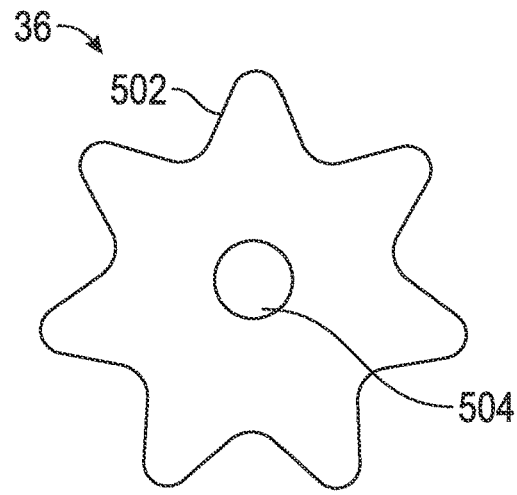
Figure 5D:
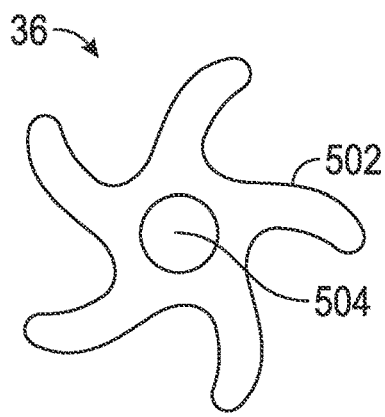
Figure 5E:
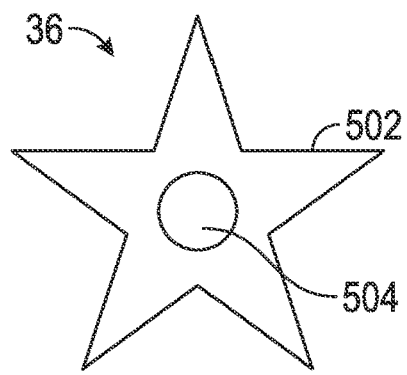
Figure 5F:
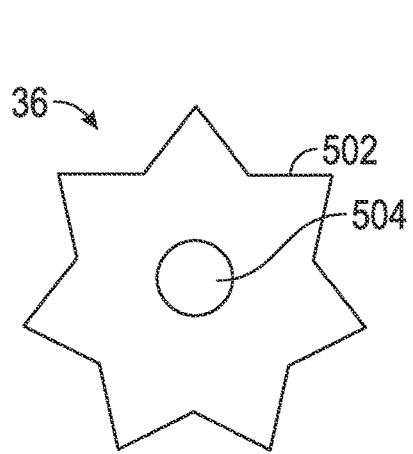

As shown in FIG. 5A, the cross section of the nozzles 36 is not a uniform shape (e.g., not like the ellipses of nozzles 36 as shown in FIG. 4). The particular arrangement of the outer perimeter 502 of each of the different nozzles shown in FIGS. 5A-5F are examples only and can be modified. The central diffuser element 504 of the nozzles 36 is also shown. All of the examples show an outer perimeter 502 that defines an outer petal-shaped exit flow for the gas. The resulting shaped flow may promote enhanced and efficient mixing between the hot bleed air introduced by the nozzle 36/injector 34 and circulating air in the D-duct 14. The number, petal shape geometry, and relative orientation of the petal-shaped air nozzles 36 can vary in a manner that optimizes their performance.

Figure 6:
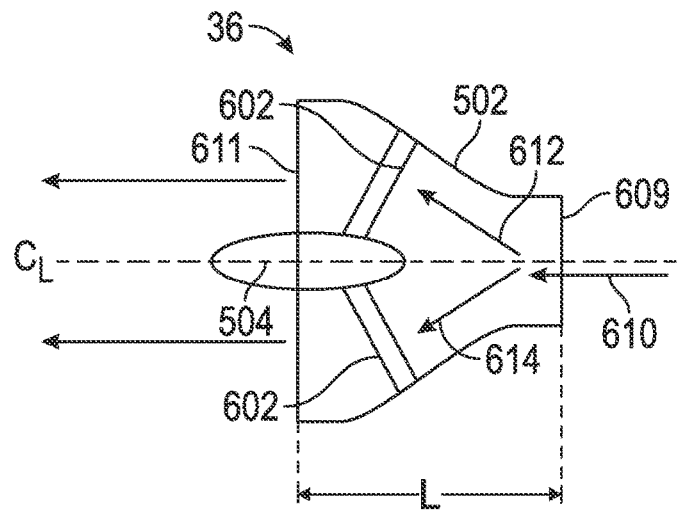
FIG. 6 shows a cross-section of a D-D-duct and an example of a shape of a particular nozzle.

As shown in FIG. 6, the nozzle 36 includes an entrance 609 and an exit 611. To ensure that the speed of the hot bleed air exiting the nozzle at exit 611 is reduced to an optimal value, the cross-sectional area of the entrance 609 is less than the cross-sectional area of the exit 611.

Each of the nozzles 36 can include a central diffuser element 504. As shown in more detail in FIG. 6, the central diffuser element 504 could be supported by one or more braces 602 that center the central diffuser element 504 within the outer perimeter 502. The central diffuser element 504 could be disposed such that is extends any distance from the entrance 609 of the nozzle 36. As illustrated, the central diffuser element 504 is disposed such that a portion of it is within the nozzle 36 and a portion is not. The central diffuser element 504 serves to split incoming gas 610 into at least two different directions 612/614. As the air diffuses from the single incoming gas stream 610 it slows before it reaches the exit 611. That is, the gas as represented by stream 610 is moving faster than that represented by streams 612/614 once they have reached the exit 611. This slowing allows the hot bleed air introduced by injector 34 to more closely match the cooler air circulating in the D-duct and, thereby, promotes greater mixing without significant axial momentum losses.

In one embodiment, central diffuser element 504 is ellipsoid shaped. Such a shape may promote mixing and drives the circumferential flow into the petal lobes (for examples, see streams 612/614) thereby increasing mixing while preventing unwanted flow separation due to excessive diffusion. In one embodiment, the central diffuser element 504 has a cross-sectional area and a ratio of the cross sectional of the central diffuser element 504 to a cross-sectional area of the entrance 609 is between 0.25 and 0.75.

Figure 9:
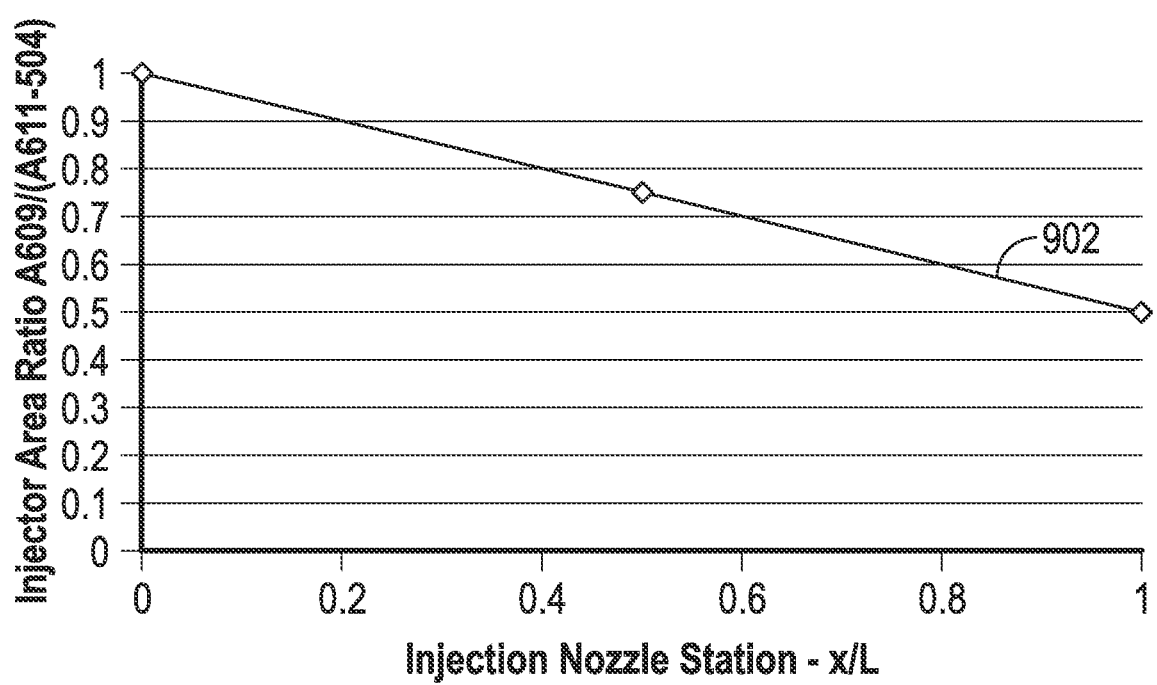
FIG. 9 shows the preferred/optimal area Injector area ratio distribution vs Injection nozzle station

The length L of the nozzle 36 can be increased to reduce gas exit speed or shortened to increase it as the circumstances of a particular D-duct may dictate. For example, a geometric area rule distribution as shown in FIG. 9, the cross-sectional flow area may be expressed as a function of nozzle length x/L where L is the length of the nozzle and x is how far along a location along that length (e.g., how far the fluid has moved through the nozzle). More precisely, the ratio may be determined such that the input to output area ratio is defined as:

Input area (e.g., $A_{609}$)/Output area (e.g., $A_{611}-A_{504}-n$ ($A_{602}$));

where $A_{609}$ is the cross-sectional area of the input, $A_{611}$ is the cross-sectional area of the output, $A_{504}$ is the cross-sectional area of the central diffuser element, $A_{602}$ is the cross-sectional area of the support brace, $A_{602}$, and n is the number of support braces $A_{602}$. Of course, to the extent that the braces do not interfere with the flow path, the term related to them could be omitted. In one embodiment, the ratio may be selected to reduce the flow rate to a desired amount while keeping constant pressure. In a specific example, the flow rate velocity may be reduced by about 50% from sonic conditions to about Mach 0.5. For example, this may be accomplished by implementing into the nozzle design shown in FIG. 6 the area distribution 902 shown in FIG. 9.

Figure 7:
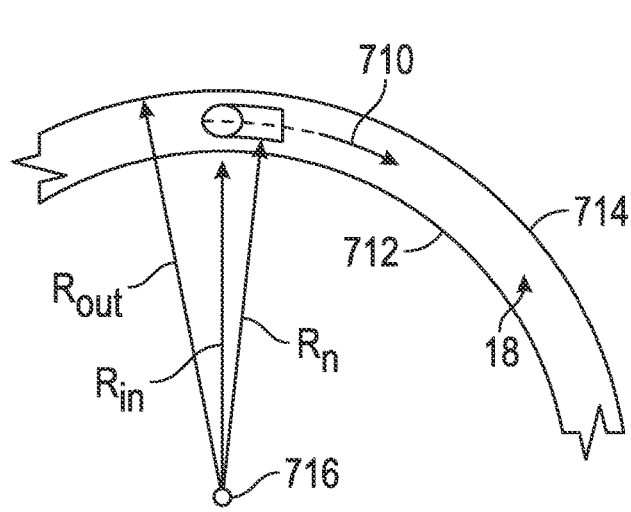
FIG. 7 shows a cross section of a D-duct and the curvature of a nozzle according to one embodiment.

FIG. 7 shows a cross-section of an example of a D-duct 18. According to one embodiment, the nozzle 36 may be curved in a manner the hot bleed air it expels is moving such that it generally follows the flow of gas already in the D-duct (e.g., along path 710).

The illustrated D-duct 710 has an inner wall 712 and outer wall 714. The inner and outer walls 712, 714 are generally circular and have a center point 716. In one embodiment, the nozzle 36 has a radius of curvature $R_n$ that is defined such that it has the same center point 716 as the inner and outer walls 712, 714 which, respectively, have radii of curvatures $R_{in}$ and $R_{out}$. That is, the inner and outer walls 712, 714 may have the same curvature as the nozzle 36.

Figure 8:
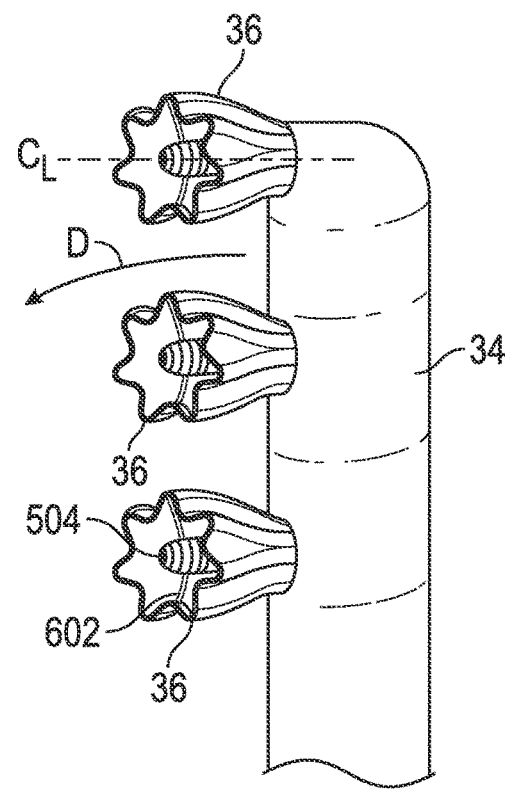
FIG. 8 shows a perspective view of an injector with nozzles according to one embodiment.

FIG. 8 shows an example of an injector 34 with three petal shaped nozzles 36 extending therefrom. Each nozzle 36 includes a central diffuser element 504 supported by braces 602. In one embodiment, the braces 602 may include airfoils on their upstream edges pointing to the incoming flow through area 609. In another embodiment, the braces 602 are elliptical having aspect ratios of between 7:1 and 5:1. The nozzle 36 curves with a curvature shown by arrow D. It shall be understood that in some cases each nozzle may have a unique curvature depending on its distance from the center point 716 described above.

In the above description, the shaping of the nozzles has been defined such that they may increase the mixing of the hot bleed air received at the injector 34 with rotating air in the D-duct. This may be accomplished by providing nozzles that expand outwardly along their length as shown above. Also, a shape of the nozzles may provide for more irregular dispersion to create greater mixing of the hot bleed air and the circulating D-duct cooler air. In addition, the nozzles may be curved along their length in such that they introduce hot bleed air in a direction generally following the currently rotating cooler air. This may reduce hot spots in walls of the D-duct in one embodiment. In short, the above description has focused on shaping and/or adjusting the speed of the hot bleed air relative to the cooler air circulating in the D-duct via particular nozzle configurations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An anti-icing system for annular turbofan engine housings comprising:
   a substantially closed annular housing at a leading edge of the turbofan engine housing, the annular housing containing a quantity of air;
   a conduit extending from a source of high pressure hot gas to the annular housing;

an injector connected to the end of the conduit and extending into the annular housing; and one or more nozzles extending outwardly from the injector in a direction that the quantity of air circulates in the annular housing while the turbofan engine is operating, the nozzles having an entrance in fluid contact with the injector and an exit, wherein a cross-sectional area of the entrance is less than a cross-sectional area of the exit such that gas leaving the nozzles is travelling slower than gas entering the nozzles wherein at least one of the one or more nozzles includes a central diffuser element disposed in a flow path of the gas entering the nozzles and supported by at least two braces that center the central diffuser element within an outer periphery of the at least one nozzle.

2. The system of claim 1, further comprising a turbofan jet engine compressor, wherein the turbofan jet engine compressor is the source of the high pressure hot gas.

3. The system of claim 1, wherein the one or more nozzles includes at least three nozzles.

4. The system of claim 1, further comprising:
one or more braces disposed within the at least one nozzle to support the central diffuser element.

5. The system of claim 1, wherein the one or more nozzles include a non-uniform shaped outer perimeter.

6. The system of claim 1, wherein one of the one or more nozzles has a length, L, and wherein the one of the one or more nozzles curves along its length as it extends away from the injector.

7. The system of claim 6, wherein the one of the one or more nozzles curves at a similar rate as the annular housing.

8. An anti-icing system for annular turbofan engine housings comprising:
a substantially closed annular housing at a leading edge of the turbofan engine housing, the annular housing containing a quantity of air;
a conduit extending from a source of high pressure hot gas to the annular housing;
an injector connected to the end of the conduit and extending into the annular housing; and
one or more nozzles extending outwardly from the injector in a direction that the quantity of air circulates in the annular housing while the turbofan engine is operating, the nozzles having an entrance end in fluid contact with the injector and an exit end, wherein one of the one or more nozzles has a length, L, between the entrance end and the exit end and wherein the one of the one or more nozzles curves along its length as it extends away from the injector;
wherein at least one of the one or more nozzles includes a central diffuser element disposed in a flow path of the gas entering the nozzles that divides the flow path of the gas and is supported by braces within an interior of the nozzles.

9. The system of claim 8, wherein the annular housing and the nozzle each have a radius of curvature, and wherein the radius of curvature of the annular housing and the radius of curvature of the one of the one or more nozzles have a same center point.

10. The system of claim 8, further comprising:
one or more braces disposed within the at least one nozzle to support the central diffuser element.

11. The system of claim 8, wherein the one or more nozzles include a non-uniform outer perimeter.

12. The system of claim 8, wherein a cross-sectional area of the entrance is less than a cross-sectional area of the exit such that gas leaving the nozzles is travelling slower than gas entering the nozzles.

13. The system of claim 8, further comprising a turbine, wherein the turbine is the source of the high pressure hot gas.

14. An anti-icing system for annular turbofan engine housings comprising:
a substantially closed annular housing at a leading edge of the turbofan engine housing, the annular housing containing a quantity of air and a conduit extending from a source of high pressure hot gas to the annular housing, the system comprising:
an injector connected to the end of the conduit and extending into the annular housing; and
one or more nozzles extending outwardly from the injector in a direction that the quantity of air circulates in the annular housing while the turbofan engine is operating, the nozzles having an entrance end in fluid contact with the injector and an exit end, wherein the nozzle has a length L between the entrance end and the exit end, wherein the one or more nozzles surrounds at least a portion of a central diffuser element disposed in a flow path of the gas entering the nozzles and in supported by braces within the nozzles.

15. The system of claim 14, wherein one of the one or more nozzles has a length, L, and wherein the one of the one or more nozzles curves along its length as it extends away from the injector.

16. The system of claim 14, further comprising:
one or more braces disposed within the at least one nozzle to support the central diffuser element.

17. The system of claim 14, wherein a cross-sectional area of the entrance is less than a cross-sectional area of the exit such that gas leaving the nozzles is travelling slower than gas entering the nozzles.

18. The system of claim 14, wherein the central diffuser element has a cross-sectional area and wherein a ratio of the cross sectional of the central diffuser element to a cross-sectional area of the entrance is between 0.25 and 0.75.

* * * * *